United States Patent
Bhargava et al.

(10) Patent No.: US 7,993,541 B1
(45) Date of Patent: *Aug. 9, 2011

(54) QUANTUM CONFINED ATOM (QCA) BASED NANOMAGNETS

(75) Inventors: Rameshwar Nath Bhargava, Ossining, NY (US); Haranath Divi, Croton on Hudson, NY (US); Adosh Mehta, Highland Mills, NY (US)

(73) Assignee: Nanocrystals Technology LP, Briarcliff Manor, NY (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/705,383

(22) Filed: Feb. 12, 2007

Related U.S. Application Data

(63) Continuation-in-part of application No. 10/436,289, filed on May 12, 2003, now Pat. No. 7,175,778.

(60) Provisional application No. 60/379,726, filed on May 10, 2002.

(51) Int. Cl.
*H01F 1/00* (2006.01)

(52) U.S. Cl. .................. 252/62.51 R; 977/774; 977/811; 977/824; 977/830; 977/838; 428/403; 428/407

(58) Field of Classification Search ........... 252/62.51 R; 977/774, 811, 824, 830, 838
See application file for complete search history.

(56) References Cited

U.S. PATENT DOCUMENTS

| | | | |
|---|---|---|---|
| 5,422,489 A | 6/1995 | Bhargava | |
| 5,422,907 A | 6/1995 | Bhargava | |
| 5,446,286 A | 8/1995 | Bhargava | |
| 5,455,489 A | 10/1995 | Bhargava | |
| 5,637,258 A | 6/1997 | Goldburt | |
| 6,036,886 A * | 3/2000 | Chhabra et al. | 252/301.4 R |
| 6,090,200 A * | 7/2000 | Gray et al. | 117/68 |
| 7,175,778 B1 * | 2/2007 | Bhargava et al. | 252/62.51 R |

* cited by examiner

*Primary Examiner* — C. Melissa Koslow
(74) *Attorney, Agent, or Firm* — William L. Botjer

(57) ABSTRACT

The present application is directed to the preparation and use of a class of nanoparticles that contain a single Quantum Confined dopant. A QCA nanocrystal comprises of a plurality of host atoms in a nanocrystal of a size of less than 10 nm with a single atom of a dopant (or activator). This single QCA dopant, when confined, becomes polarized and creates a large magnetic-moment in a nanosize host that contains atoms of unpaired spins. The quantum confined atom (QCA) which is now pinned, triggers the alignment of the host atoms resulting in nanosize magnetic domain. Engineering of nanomagnets based on QCA nanoparticles can be used in different applications such as: sensors, drug delivery, bio-tagging, cell/DNA tagging, magnetic memories and others.

14 Claims, 3 Drawing Sheets

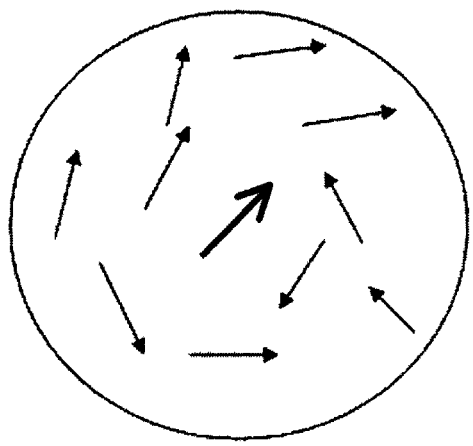
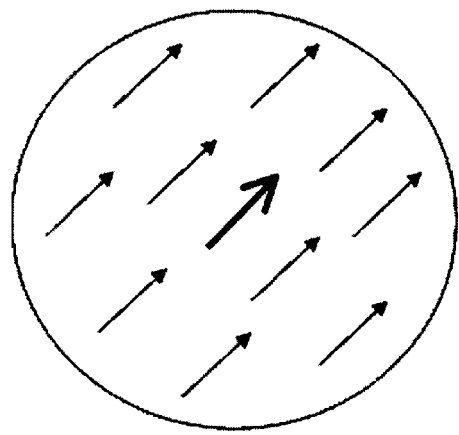
Fig. 3A          Fig. 3B
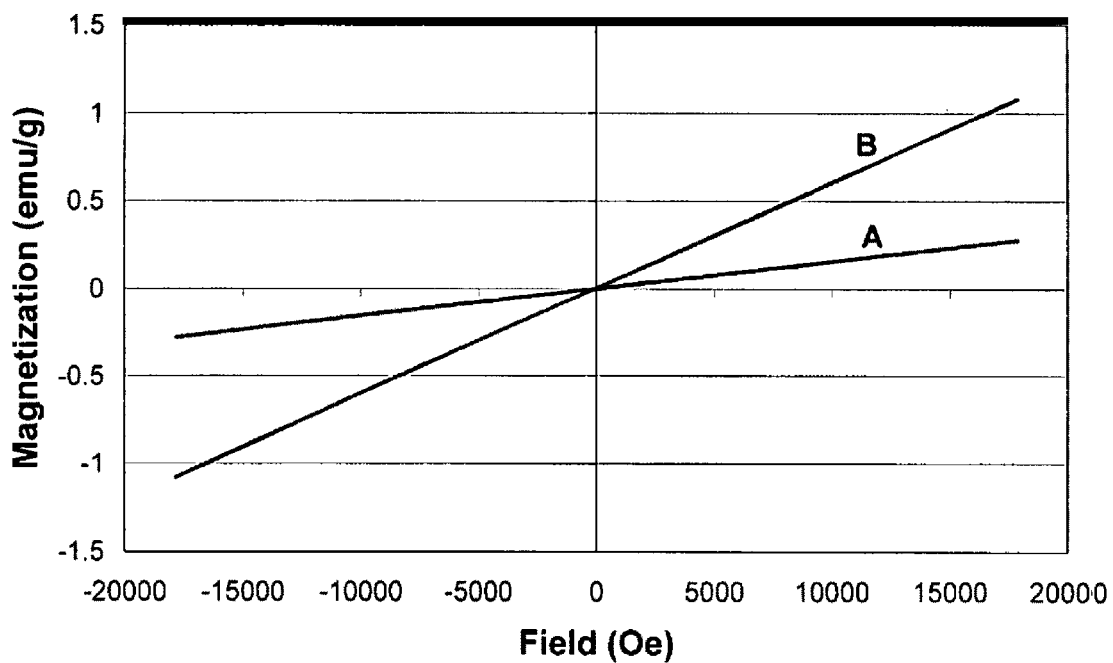
FIG. 4

QUANTUM CONFINED ATOM (QCA) BASED NANOMAGNETS

CLAIM FOR PRIORITY

This is a continuation in part, and claims the priority, of U.S. patent application Ser. No. 10/436,289 filed May 12, 2003, entitled "Self-Aligned QCA Based Nanomaterials" now U.S. Pat. No. 7,175,778; the disclosure of which is hereby incorporated by reference, which in turn claims priority of U.S. Provisional patent application Ser. No. 60/379,726 filed May 10, 2002.

BACKGROUND AND SUMMARY OF THE INVENTION

This invention relates to nanotechnology which is the science of controlling and manipulating particles (atoms and molecules) smaller than 20 nanometers. A nanometer is approximately 75 thousand times smaller than the width of human hair, or about 3 to 8 atoms wide. Specifically this invention relates to the production and applications of nanoparticles that behave like small magnets, i.e. nanomagnets Since the discovery of doped nanocrystals (DNC) in 1994 made from ZnS with Mn2+ as the dopant, (See R. N. Bhargava et. al. Physical Rev. letters 72, 416 (1994)). Several applications of these class of DNC's have appeared (See U.S. Pat. Nos. 5,422,489, 5,422,907, 5,446,286, 5,455,489 and 5,637,258). In all the earlier work on doped nanocrystals, the size of the host was estimated to be less than 10 nm for efficient generation of light. These materials were developed over several years for various applications. In all the applications and products, the light generated in the nanocrystals was associated with the dopant (also called an impurity or activator) while the absorption of the exciting light was associated with the host.

An active dopant when incorporated in a semiconductor provides an additional free electron or hole that modulates the electrical conductivity of the semiconductor and thereby provides the precise control of device parameters. The role of these dopant is well documented in semiconductors. On the other hand, if a dopant, usually referred as an activator, is incorporated in an insulator, it can act as a very good radiative recombination center for the excited electrons and provide efficient light. These materials are referred as phosphors. The difference between semiconductor dopant and phosphor activator being that activator does not modulate the electrical conductivity while dopant in semiconductor does.

On the other hand if a dopant or impurity is incorporated in a semiconductor or insulator nanocrystal of 2 to 5 nm size, the luminescent properties of the dopant are strongly affected by the quantum confinement provided by the dielectric boundary of the nanocrystal. The dopant in a nanocrystal, henceforth referred as quantum confined atom (QCA), generates high luminous efficiency. This observed high efficiency along with other experiments performed on individual nanocrystal have confirmed unequivocally that only a single dopant per nanocrystal was incorporated (c.f. (M. D. Barnes et. al, J. Phys. Chem. B 104 6099, 2000; and A. P. Bartko et. al. Chemical Physics Letters 358 459, 2002.) It is also known that two or more such dopants/activators per nanocrystal will lead to phenomena of concentration quenching and drastically reduce the quantum efficiency. It is important to note, that the properties of the single atomic ion activator in nanocrystal of size less than 10 nm are modified due to quantum confinement. This has been published in detail (R. Bhargava et. al. Phys. Rev. Letts. 72, 416, 1994; R. Bhargava et. al. Phys. Stat. Sol., (b) 210, 621, 1998). Thus, for luminescent applications of QCA-based nanocrystals, we can conclude that only the luminescent properties of the QCA activator has been modified without any changes in the optical properties of the nanocrystalline host.

In the case of QCA based nanophosphors, recent studies (M. D. Barnes et. al, J. Phys. Chem. B 104 6099, 2000; and A. P. Bartko et. al. Chemical Physics Letters 358 459, 2002) suggest strongly that there is either one activator-ion or zero activator-ion per nanocrystal i.e. creating digital doping. The probability of incorporation of the single activator-ion in a nanocrystal critically depends on the preparative methods, the starting concentration of activator-ion with respect to the ion it replaces and the size of the host. To incorporate a single dopant ion in a nanocrystal, the chemistry of preparation has to be adjusted. For example, the probability of incorporating the dopant-ion in the host decreases rapidly as the size of the host size decreases. In order to increase the probability of incorporation in smaller particles, we increase the concentration of the dopant-ion in starting reactant five to ten fold. This higher concentration of dopants in starting solution ensures that the smallest of the particles have a single dopant ion that is necessary for the light generation.

Recently we have demonstrated that in QCA based nanomaterials, the efficiency of the light emanating from a single caged atom (ion) is the highest when the particle size is less than 5 nm. As the size decreases from 10 nm to 2 nm, the light from the caged atom increases non-linearly as the size decreases. Recent developments in the preparation and separation of the particles, along with microscopic-optical studies of individual nanophosphors had led to a greater degree of understanding of the role of a single atom in a nanoparticle. Several devices and applications and products now emerge from this newly found science of QCA for the next generation devices using nanotechnology.

QCA Based Nanomagnets

A single atom of a dopant (activator) is confined in a cage of a 2 nm to 5 nm size nanoparticle of the host compound (8 to 20 atoms in a linear chain) is schematically represented in FIG. 1A where the atom is represented as a charged cloud, a correct quantum mechanical representation of an atom. Upon further decrease of size of the host-cage as depicted in FIG. 1B, the QCA due to quantum confinement shows extraordinary changes in the charge distribution and influences both the optical and magnetic properties.

Recent research has established for the first time that a single atom in the cage experiences the 'quantum confinement' effect and that generates efficient light. This discovery demonstrates that the properties of a single atom can be manipulated controllably, and will impact optical and magnetic devices and is expected to become a formidable branch of Nanotechnology. Furthermore, the QCA's produced herein show self aligning (self-organizing) properties which can lead to self assembling nanodevices which is a significant step as it moves nanoparticles from the laboratory to commercially useful devices.

The present application is directed to the preparation and use of a class of nanoparticles called Quantum Confined Atoms or QCA based nanocrystals. A QCA based nanocrystal is a particle of material comprising a plurality of host atoms in a size less than 10 nm with a single atom of a QCA-dopant confined within. The QCA's have unique luminescent and optical properties that include efficient linearly-polarized light as depicted in FIG. 2. FIG. 2 shows the emission pattern from a single Eu3+ ion (left) and the pattern generated by the same particle after introducing a sheet polarizer at 45° (right). The pattern on the right clearly indicates linearly polarized emission from a single ion (the dopant) in a nanocrystal cage. The linearly-polarized light observed in luminescence (c.f. M. D. Barnes et. al, J. Phys. Chem. B 104 6099, 2000; and A. P. Bartko et. al. Chemical Physics Letters 358 459, 2002) is due to a fixed polarization of the electric vector associated with a single dopant ion. Electromagnetic coupling utilizing Maxwell's equation suggest that the magnetic-field vector associated with the QCA must also be polarized. Thus if the host-cage and dopant-ion are chosen to have the strong electron magnetic-spin, the polarized magnetic field generated by the QCA will transform the nanocrystal to a nanomagnet.

In case of nanomagnets, the interaction associated with a QCA goes beyond what we have observed in QCA based luminescent materials. The doped QCA which is chosen to have large magnetic moment due to unpaired electron-spins, will become spin-polarized due to the quantum confinement imposed by the nanosize host. This is shown in FIG. 3A, with host spins randomly oriented. Since the chosen magnetic QCA-ion is now spin-polarized, it will impose a large magnetic field to its neighboring atoms of the nanocrystalline host. If the host atoms have also magnetic moment due to unpaired spins, all such spins will align due to strong magnetic-interaction referred as spin-spin exchange interaction. Due to this strong mutual magnetic interaction among the QCA dopant and the host atoms, all the spins align as depicted in FIG. 3B and make the entire nanocrystal a nanomagnet as shown in FIG. 3B. As discussed above in case of the QCA based luminescent materials the modified luminescent properties of the QCA do not modify the luminescent properties of nanocrystal host. Thus nanomagnets have additional modification imposed upon the QCA based nanomaterials due to direct spin-exchange interaction. This is fundamental breakthrough and distinguishes this patent from earlier QCA or doped nanocrystal patents issued to Nanocrystals Technology.

BRIEF DESCRIPTION OF THE DRAWINGS

For a better understanding of the invention, reference is made to the following drawings which are to be taken in conjunction with the detailed description to follow in which:

FIG. 3A shows the spin of the QCA dopant become polarized in a fixed direction, the polarized QCA dopant immediately triggers the alignment of all host-atom spins due to spin-spin exchange interaction as shown in FIG. 3B.

FIG. 4 is a graph showing the effect of incorporation of a Mn ion in EuS nanoparticles on magnetic susceptibility.

DESCRIPTION OF THE PREFERRED EMBODIMENTS

Figure 1:
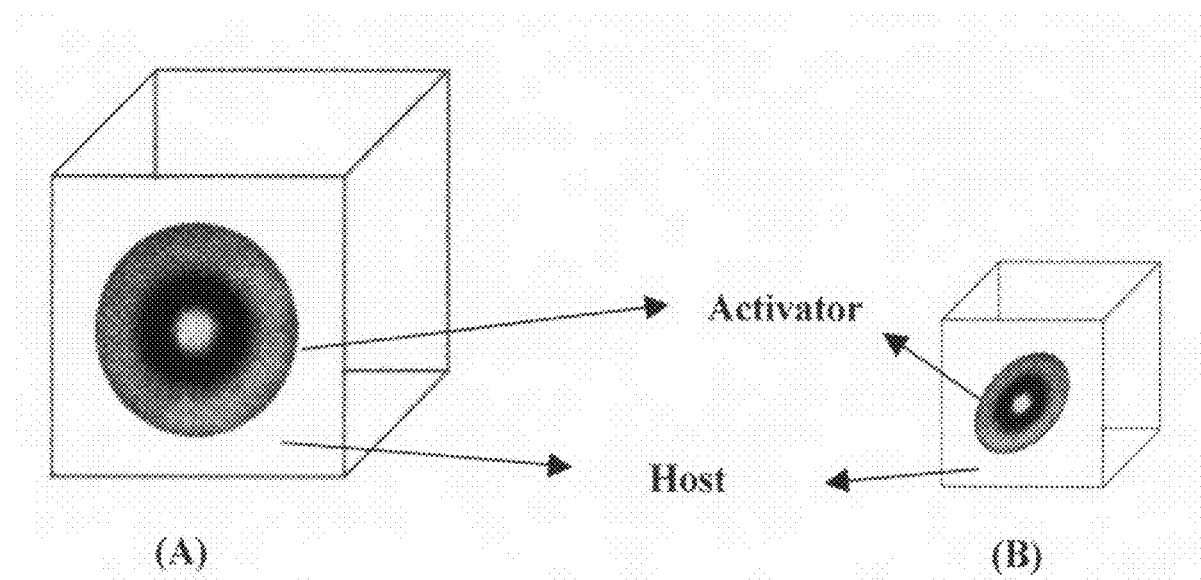
FIG. 1A is a schematic representation of a Quantum Confined Atom (QCA); where the quantum confinement shown in 1B leads to a polarized atom.
Figure 2A:
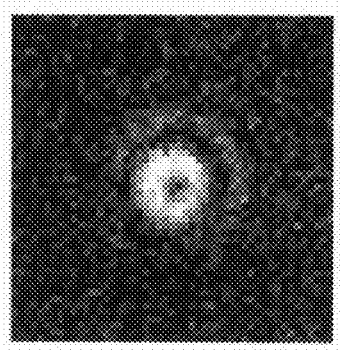
FIGS. 2A and 2B are photomicrographs showing polarized light output of the QCA nanoparticles.
Figure 2B:
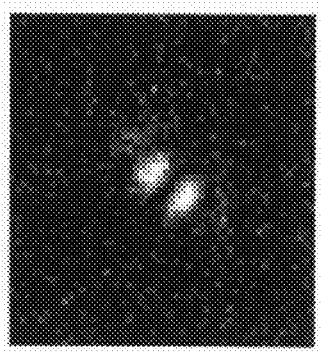

When an atom is confined by the dielectric boundary provided by a nano-cage, the electron distribution as shown in FIG. 1A no longer is expected to be spherical or symmetrical. The charge cloud of the single atom begins to acquire the shape of the host and thereby becomes asymmetric as shown in FIG. 1B. The asymmetry in the charge distribution can lead to several changes in the luminescent and magnetic properties of the QCA. For example, the light emanating from a single QCA can become linearly polarized as seen in FIG. 2 The light from a single QCA when seen through a 45 degree polarizer splits the radiation pattern just like a radiation of a molecule. Thus a single atomic ion of QCA, when distorted in a nano-cage behaves like a molecule i.e. a polarized atom. This polarization associated with QCA unpaired spin triggers the spin polarization of the unpaired spins of the host yielding nanomagnets.

We have used two different chemical processes to prepare QCA-nanomagnets. The choice of the process depends critically upon the chemical composition of the nanocrystal and the phase (liquid or solid) of the final product. These methods can yield either nanomagnets as powder or dispersed in a solution for different applications. In the case of powder nanomagnets, particularly, a coating is required to prevent agglomeration and subsequent growth to larger size nanoparticles. The nanomagnets are prepared such that thin film coating of surface not only prevents agglomeration but allows one to attach these nanomagnets to organic or biological molecule.

The anti-agglomeration coating surrounding the nanoparticle can be for example: alkoxysilane, octylphosphine oxide, carboxylic acid, stearic acid, mercepto acetic acid, polyphosphates, polyethylene glycols and oleic acids. A binding coating surrounding the anti-agglomeration coating to enable the nanoparticles to bind to other molecules may also be used.

Procedure for Nanomagnet Powders

Nanomagnets of EuS:Mn and $Gd_2S_3$:Tb are chemically prepared by adapting a room-temperature colloidal nanochemistry process with soluble salt precursors and an external surfactant. The crystallographic and structural properties are similar to those of undoped EuS/$Gd_2S_3$, while the magnetism is primarily due to the doping of a divalent transition metal or trivalent rare-earth ion. Structural analysis confirms that the magnetism in these nanomagnets is not due to segregated MnO or $Tb_4O_7$ phases but truly represents the effective incorporation of single ionic dopant inside the rare-earth sulfide nanocrystal. Since sulfide nanoparticles grow rapidly in liquid medium, there is an obvious need for a suitable capping agent to prevent the growth.

We have used a room-temperature colloidal synthetic process for the synthesis of sulfide based nanomagnets. The typical preparation of EuS:Mn nanomagnets was carried out by dissolving chloride salts of Eu and Mn in alcoholic medium along with polyvinylpyrrolidone (PVP). A calculated amount of $Na_2SO_3$ was also added as a reducing agent to prevent the oxidation of $Eu^{2+}$ ions during the process. PVP acts as a polymeric surfactant for growth arrest of nanoparticles. To the above solution a stoichiometric amount of a sulfide ion containing alcoholic solution was added under constant stirring at room-temperature. Care was taken to ensure rapid mixing of both solutions in order to have narrow size distribution of resulting particles. Finally, the nanomagnetic particles are extracted by vacuum drying the solvent at low temperatures (<50° C.).

In a typical example for preparation of EuS:Mn nanomagnets, 1 millimole of $EuCl_2$ is dissolved in 10 ml of ethanol. To this $MnCl_2.4H_2O$ was added in the range 0-10 millimoles, depending upon the dopant concentration with respect to $Eu^{2+}$ ions. 1 millimole of $Na_2SO_3$ was also added along with 100 mg of PVP under constant stirring conditions at room temperature. 10 ml of 1 mM $Na_2S$ was added as the source of sulfur. Mn doped EuS nanoparticles that show magnetic behavior, were precipitated at room temperature. The particles are vacuum dried and tested for magnetic characterization. FIG. 4 shows the magnetic moment of EuS nanocrystals at room temperature as measured by vibrating sample magnetometer (VSM) for two different samples. Sample A contains no Mn doping while sample B contains Mn doping. The incorporation of a single Mn2+ ion in nanoparticle of EuS increases the magnetic moment.

Figure 5:
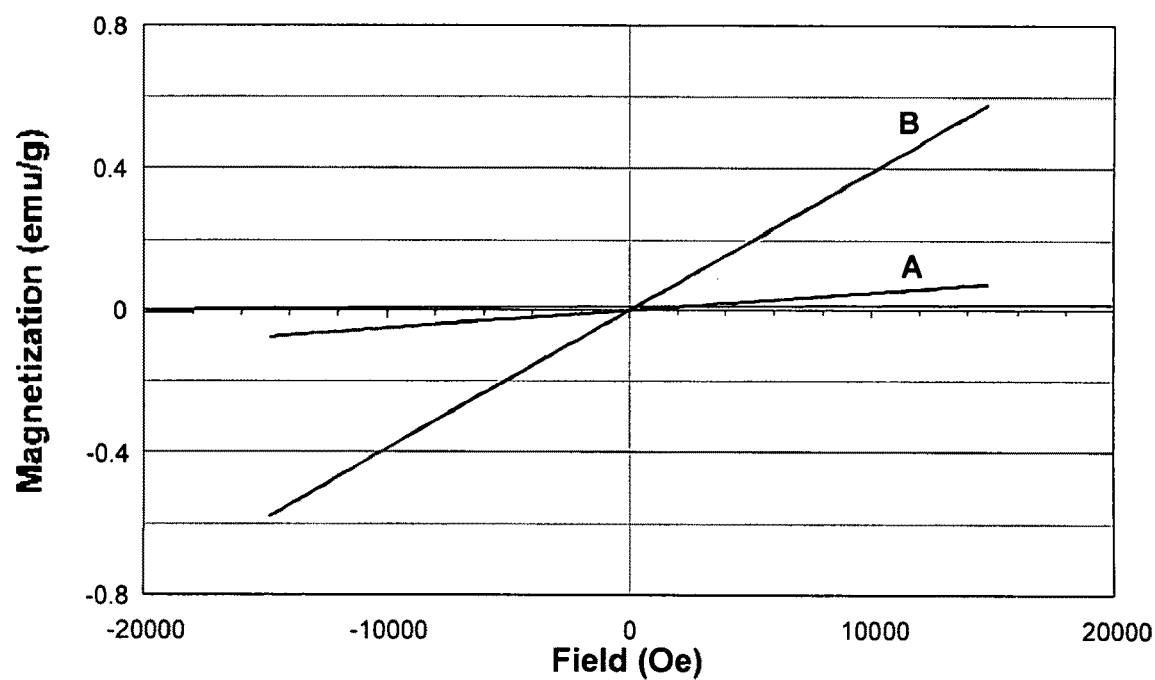
FIG. 5 is a graph showing the effect of incorporation of a Tb ion in $Gd_2S_3$ nanoparticles on magnetic susceptibility.

Tb-doped $Gd_2S_3$ nanomagnets were prepared in the following way. 10 millimole of $GdCl_3.6H_2O$ is dissolved in 10 ml of ethanol. To this $TbCl_3.6H_2O$ was added in the range 0-100 millimoles, which provides the required $Tb^{3+}$ ions for doping. 1 g of PVP was added under constant stirring. 10 ml of 10 mM $Na_2S$ was added, which resulted the precipitation of Tb doped $Gd_2S_3$ nanoparticles. After ultrasonication for about an hour the particles are centrifuged and vacuum dried. FIG. 5 shows the magnetic moment of Gs2S3 nanocrystals at room temperature as measured by vibrating sample magnetometer (VSM) for two different samples. Sample A contains no Tb doping while sample B contains Tb doping. The incorporation of a single $Tb^{3+}$ ion in a nanoparticle of Gs2S3 increases the magnetic moment.

In case of the above nanomagnets or other nanomagnets, we have chosen the host such that (i) the cation of the nanocrystalline host possess a large magnetic moment due to either unpaired d or f electrons and (ii) the dopant-ion also has a well defined magnetic moment from unpaired d or f electrons. As an example we list in the table below the large electronic magnetic moment available in different rare-earth (RE) elements:

| Rare earth Element (RE) | No. of 4f electrons in trivalent state | Atomic magnetic moment $\mu_B$ |
| --- | --- | --- |
| Europium | 6 | 7.0 |
| Gadolinium | 7 | 7.0 |
| Terbium | 8 | 9.0 |
| Dysprosium | 9 | 10.0 |
| Holmium | 10 | 10.0 |

Incorporation of a single dopant atom in a nanoparticle of 2 to 5 nm to create a nanomagnet is one of the important findings of this invention. The choice of dopant and host, chemicals and concentration range, helps to increase the probability of incorporation of a single activator ion in a nanosize particle. The goal is to incorporate a single activator ion in the host when the size decreases from 10 nm to 2 nm. The probability of incorporation rapidly decreases as the size of the host decreases. Therefore, in order to avoid small particles being void of an activator, a molar concentration of starting activator-ion solution is used that is 5 times to 10 times higher than what is normally used in the preparation of bulk materials. This leads to incorporation of a single dopant-ion in 2 to 10 nm size particles. This is important to increase the density of nanomagnets in a given production process.

The present invention can be used with a variety of nanomagnets comprising host materials such as divalent rare-earth (RE) compounds such as EuS, EuSe, EuTe and EuO and trivalent RE compounds like Gd2S3, Gd2Se3, Gd2Te3 and Gd2O3. Each of these divalent RE compounds may be doped with divalent transition metals, magnetic impurities such as Mn, Co, Ni, Fe, which will result in nanomagnets. In case of trivalent RE compounds suitable trivalent RE such as Eu, Gd, Tb, Dy and Ho that possess large electronic magnetic moment can be used to fabricate nanomagnets.

As an example, the quantum confinement imposed by $Gd_2O_3$ nanocrystal on Tb-ion polarizes the atom yielding a fixed direction Tb-spin. Since the Tb-ion has 7 electrons with spin 'up' and one with spin 'down', the net spin of a single atom is 3 (7/2-1/2). The Gd-ion in a Gd2O3 nanocrystal has 7 electrons all pointing 'up' yielding 7/2 spin. The polarized Tb-ion spin polarizes all the Gd-ions due to spin-spin exchange interactions and aligning all the Gd-ions Thus QCA based nanocrystals of $Gd_2O_3$ in the size range of 2 to 5 nm are converted into nanomagnets when only a single $Tb^{3+}$ dopant-ion is incorporated in each of the nanocrystals. These nanomagnets when left in a gel are free to move interacting weakly among themselves. In a slow evaporation process, these nanomagnets show self alignment to form linear rods, thereby demonstrating self-assembly.

The asymmetric properties of the QCA that lead to generation of linearly polarized light suggest that we indeed have a possibility of polarized magnetic spin. If the atomic-ion and the host are chosen with proper unpaired-electron spin, we expect to use the magnetic polarization of the QCA to turn the nanocrystal host into a single magnetic domain. The fact that we have a magnetic domain of 2 to 10 nm and preferably 2 to 5 nm and emits linearly polarized light suggests that these materials are good magneto-optical materials. The read and write magneto-optical discs with very high densities are thus possible, using QCA based magnetic nanoparticles.

The thin coating over the nanomagnets can be further modified to have an active chemical bond that could be effectively used to bind to other chemical molecules (organic or inorganic), proteins and antibodies. These modified surfaces are then used for biotagging, preparing nanocomposites The examples of coating modifications (binding coatings) on the nanomagnets are phosphate (—$PO_4$), amine (—$NH_2$), vinyl (-$nCH_2$—$CH_3$), carboxyl (—COOH), and thiol (—SH). These active groups provide the bridging to antibodies and proteins for the purpose of generating a magnetic tag that can be attached to a specific site in a biological or a molecular system Applications of QCA Based Nanomagnets The control and modulation of a single atomic ion in cage of 2 to 5 nm has allowed us to develop nanomagnets that will have several novel applications particularly in the area of biology and bio-technology. The properties of the QCA based materials are dictated by both the choice of the atom and the host. The discovery of QCA has allowed us to modify the properties of a single atomic ion and its nanosize host utilizing quantum effects at room temperature. This breakthrough is based upon that: (i) The quantum confinement of a single atom modifies the property of the atomic-ion and (ii) The confined atom, in turn, creates QCA-nanoparticles with unique properties such as large magnetic moment and efficient luminescence. The magnetic interaction among the nanomagnets in a solvent or viscous media can result in self-assembled practical device structures Magneto-Optical Devices and Sensors The confinement of the activator atom by the host compound changes the spherical charge distribution (symmetric see FIG. 1A) of the electron-cloud of the atom to more like pancake (asymmetric see FIG. 1B) like electron-cloud, which leads to generation of polarized light from the QCA. The confinement induced asymmetry is very useful for making device structures. The asymmetry induced in material like $Gd_2O_3$:$Tb^{3+}$ can make the nanoparticles magnetic due to interaction of the spin of Tb-atom and the spins of Gd-atoms. The polarized spin of Tb-atom aligns all the Gd-atom spins leading a small domain like nano-magnet. These nano-magnets, if left in a solution under an appropriate environment, lead to self organized structures. Each nanomagnet aligns with the neighboring nanomagnet leading from beads (nanoparticles) to necklace (nanowire) like structures.

These QCA based nanowires can be embedded into Silicon based Hall sensors, the magnetic field can be measured accurately and with great sensitivity. Such sensors are useable in automotive, electronic, global positioning and magnetic recording systems. The current GMR based high density micro-disc can be surpassed using QCA-based nanomagnets. These nanomagnets are also optical active. The combination of polarized light, and magnetic alignment is expected to yield very sensitive Kerr effect/Faraday rotation magneto-optical devices and memories. A future extension of these devices could be a magnetic semiconductor that operates at room temperature.

The nanocomposites created by incorporating nanomagnets in different matrices will enhance the magnetic susceptibility of nanocomposites, in particular involving organic systems. This will have numerous applications. If the susceptibility of magnetic core in motors can be enhanced by 10%, it is major contribution to energy saving.

The self-organized magnetic devices will have impact in sensors, particularly in the realm of biological and medical applications. The QCA's with their enhanced magnetic properties are ideally suited for all bio-tagging applications. The advent of nanomagnets will trigger numerous applications such as targeted drug delivery as well as cell/DNA delivery, sensors, magnetic memories and other semiconductor based integrated devices. As an example, for targeted drug delivery applications, the nanomagnets are attached to the drug using chemical bonds (ligand). Because of the size of the nanomagnets, the drug medicinal properties are not modified by the presence of nanomagnets except that the drug becomes magnetic. Under external magnetic field, the 'magnetic drug' can be moved to a given location and concentrated for an effective treatment.

In particular, the development of 2-10 nm size nanomagnets that show single magnetic domain have applications not only in magnetic memories, spintronics based devices, magneto-optical devices, MEMS, MRAM, GMR but also have other applications in targeted drug delivery and bio-sciences. The bio-tag having luminescent signature and magnetic control could help us to develop novel bio-materials. Controlled self-assembled structures based on magnetic properties of QCA-nanomagnets could be one of the biggest nanotechnology breakthroughs. Thus in the coming decade, we expect control of nanoparticles by incorporation of a single dopantion, i.e. atomic engineered nanoparticles. for self-assembled microstructures for different novel devices.

The present invention has been described with respect to exemplary embodiments. However, as those skilled in the art will recognize, modifications and variations in the specific details which have been described and illustrated may be resorted to without departing from the spirit and scope of the invention as defined in the claims to follow.

What is claimed is:

1. A particle of material comprising a plurality of magnetic host atoms in a nanoparticle of a size of 2-10 nm with a single atom of a magnetic dopant confined within and an anti-agglomeration coating surrounding the nanoparticle.

2. The particle as claimed in claim 1 wherein the nanoparticle has a size of 2-5 nm.

3. The particle as claimed in claim 1 wherein the anti-agglomeration coating surrounding the nanoparticle is selected from the group consisting of alkoxysilane, octylphosphine oxide, carboxylic acid, stearic acid, mercepto acetic acid, polyphosphates, polyethylene glycols and oleic acids.

4. The particle as claimed in claim 1 further including a binding coating surrounding the anti-agglomeration coating to enable the particle to bind to other molecules.

5. The particle as claimed in claim 4 wherein the binding coating surrounding the anti-agglomeration coating is selected from the group consisting of phosphate (—PO4), amine (—NH2), vinyl (-nCH2-CH3), carboxyl (—COOH), and thiol (—SH).

6. A nanoparticle having a host and a magnetic dopant, the host comprising a rare earth magnetic compound of the formula AB wherein A is selected from the group of Eu, Gd, Tb, and Dy or Ho, and B is selected from the group of S, Se, Te, and O and an anti-agglomeration coating surrounding the nanoparticle.

7. The nanoparticle as claimed in claim 6 wherein the magnetic dopant is a rare earth element.

8. The nanoparticle as claimed in claim 6 wherein the host has a size of 2 to 10 nm.

9. The nanoparticle as claimed in claim 6 wherein the anti-agglomeration coating surrounding the nanoparticle is selected from the group consisting of alkoxysilane, octylphosphine oxide, carboxylic acid, stearic acid, mercepto acetic acid, polyphosphates, polyethylene glycols and oleic acids.

10. The nanoparticle as claimed in claim 6 further including a binding coating surrounding the anti-agglomeration coating to enable the nanoparticles to bind to other molecules.

11. The nanoparticle as claimed in claim 10 wherein the binding coating surrounding the anti-agglomeration coating is selected from the group consisting of phosphates (—PO4), amines (—NH2), vinyls (-nCH2-CH3), carboxyls (—COOH), and thiols (—SH).

12. A nanomagnet having a particle size of 2-10 nm comprising a host material of a magnetic divalent rare-earth compound and a magnetic dopant of a divalent transition metal.

13. The nano magnet as claimed in claim 12 wherein the magnetic divalent rare-earth compound is selected from the group consisting of EuS, EuSe, EuTe and EuO.

14. The nano magnet as claimed in claim 12 wherein the divalent magnetic transition metal dopant is selected from the group consisting of Mn, Co, Ni, and Fe.

* * * * *